US006165932A

United States Patent [19]
Narula

[11] Patent Number: 6,165,932
[45] Date of Patent: Dec. 26, 2000

[54] TRANSITION METAL OXIDES USEFUL IN FABRICATION OF NOX ABSORBENT FORMULATIONS

[75] Inventor: Chaitanya Kumar Narula, Ann Arbor, Mich.

[73] Assignee: Ford Global Technologies, Inc., Dearborn, Mich.

[21] Appl. No.: 09/227,849

[22] Filed: Jan. 11, 1999

[51] Int. Cl.[7] .............................. B01J 23/00; C03C 3/00; C04N 35/03; C01F 17/00; C01G 49/00
[52] U.S. Cl. ...................... 502/303; 502/327; 502/328; 502/330; 502/332; 502/335; 502/336; 502/337; 502/338; 502/341; 502/346; 502/415; 502/524; 501/12; 501/126; 501/127; 501/153; 423/263; 423/594; 423/600
[58] Field of Search ..................... 502/303, 327, 502/328, 330, 332, 335, 336–338, 341, 346, 415, 524; 501/12, 126, 127, 153; 423/263, 594, 600

[56] References Cited

U.S. PATENT DOCUMENTS

| | | | |
|---|---|---|---|
| 4,244,986 | 1/1981 | Paruso et al. | 427/126.4 |
| 4,610,866 | 9/1986 | Debsikdar et al. | 423/600 |
| 5,134,107 | 7/1992 | Narula | 502/303 |
| 5,403,807 | 4/1995 | Narula | 502/303 |
| 5,494,863 | 2/1996 | Mathur | 501/12 |
| 5,883,037 | 3/1999 | Chopin et al. | 502/308 |

FOREIGN PATENT DOCUMENTS

| | | |
|---|---|---|
| 0 613 714 A2 | 10/1994 | European Pat. Off. . |
| 754494 | 1/1997 | European Pat. Off. . |

*Primary Examiner*—Mark L. Bell
*Assistant Examiner*—Patricia L. Hailey
*Attorney, Agent, or Firm*—Lorraine S. Melotik

[57] ABSTRACT

The invention is a sol-gel processed metal-aluminum based oxide material useful as a catalyst including a NOx trapping catalyst. It is made from alkoxides comprising heterometallic alkoxides. The metal is transition metal, one or both of alkali metal and alkaline earth metal, and optionally also a lanthanide. Then invention is also a method of treating lean-burn internal combustion engine exhaust gas with this material, without any precious metal included with the material, in the exhaust gas system. The method comprises locating the NOx trap in the system where the NOx trap absorbs nitrogen oxides during lean cycle operation and desorbs the nitrogen oxides when the concentration of the oxygen in the exhaust gas is lowered as during a rich or stoichiometric cycle.

15 Claims, 1 Drawing Sheet

TRANSITION METAL OXIDES USEFUL IN FABRICATION OF NOX ABSORBENT FORMULATIONS

FIELD OF THE INVENTION

The invention is directed to oxides made from at least two kinds of heterometallic alkoxides. More particularly, one of these alkoxides includes aluminum and transition metal, and the other alkoxide includes aluminum with either alkali metal or alkaline earth metal. Optionally, additionally, a heterometallic alkoxide with aluminum and lanthanide can be employed. In one application, the oxides are useful to treat lean-burn engine exhaust gas from gasoline or diesel engines by absorbing NOx from the exhaust gas.

BACKGROUND OF THE INVENTION

Lean-burn engines are being utilized to improve fuel economy. These engines operate using oxidizing air/fuel ratios and require unique exhaust gas treatment for conversion of the carbon monoxide, hydrocarbons, and nitrogen oxides (NOx) produced during engine operation into more desirable gases. NOx is the most difficult to convert because the exhaust gas is oxidizing yet NOx needs to be reduced. One of the most promising treatments for lean-burn operation today involves the use of nitrogen oxide absorbent material with precious metal. Such NOx trap materials are able to absorb nitrogen oxides during lean-burn operation and are able to release them when the oxygen concentration in the exhaust gas is lowered. Hence, these traps are used with engine systems which operate primarily in a lean air/fuel ratio, but then when it is desired to purge the traps of NOx, the exhaust entering the trap is made richer, particularly rich of stoichiometric.

Typical conventional NOx traps use an alkaline earth metal like barium combined with a precious metal catalyst like platinum deposited on a porous support like alumina, as disclosed, for example, in EP patent application 0 613 714. The widely held mechanism for this absorption phenomena is that during the lean-burn operation the platinum first oxidizes NO to $NO_2$ and the $NO_2$ subsequently forms a nitrate complex with the other material, e.g., the barium. In the regeneration mode as during a stoichiometric or rich environment, the nitrate is thermodynamically unstable, and the stored NOx is released. NOx then catalytically reacts over the platinum with reducing species in the exhaust gas like HC and CO to form $O_2$ and $N_2$.

The alkali metal and alkaline earth metals loaded on the porous support as typically utilized for NOx sorption have the serious drawback, however, that they are readily poisoned by sulfur in the exhaust gas. Most fuels for automotive vehicles contain sulfur and when burnt, the sulfur is converted to sulfur compounds like $SO_2$. Over time, the sulfur compounds react with these alkali metal or alkaline earth trap materials forming sulfates and sulfides which will not easily revert back to the sorption material. These sulfates are inactive for NOx sorption. The alkali metals are particularly problematic.

The regeneration of NOx traps after sulfur poisoning needs to be carried out at relatively high temperatures in order to decompose the sulfates. These high temperatures result in the sintering of platinum as well as alkali metal/alkaline earths-alumina materials. Sintering of platinum means that the small particles of platinum coalesce to form large particles, thereby, reducing the number of catalyst sites. This leads to reduced efficiency of NOx to $NO_2$ conversion. The sintering of alkali metal/alkaline earths-alumina materials means that the these materials loose surface area due to increase in particle size and loss of porosity. This results in inefficient contact with platinum and exhaust gases leading to inefficient trapping.

In commonly owned application Ser. No. 09/184,146 filed Nov. 2, 1998 and entitled "Use of Sol-Gel Processed Alumina-Based Metal Oxides for Absorbing Nitrogen Oxides in Oxidizing Exhaust Gas", we disclose use of a precious metal/oxide material for absorbing NOx in lean-burn engine exhaust. The sol-gel processed oxide material includes oxides of metals, consisting essentially of aluminum; at least one of alkali metal and alkaline earth metal; and optionally lanthanide metal. The material can be made from heterometallic alkoxides.

According to the present invention, we have now found that an aluminum based oxide substantially free of precious metal and made by sol-gel techniques from alkoxides including heterometallic alkoxides provides NOx traps which have excellent thermal stability, being significantly better than conventional NOx traps. The present invention aluminum based oxide includes transition metal. In addition, it includes alkali metal, alkaline earth metal, or both. In the oxides, chemical bonds exist between the elements therein as compared to traditional alumina materials which have been loaded with metals which are devoid of such chemical bonds. Ir the invention oxide, the transition metals exist as fully formed metal oxides under lean burn conditions and are in intimate contact with alkali metal/alkaline earths in alumina matrix. Thus the transfer and entrapment of NOx occurs efficiently. High temperature treatment to remove SOx which may have been absorbed does not reduce the ability of transition metal oxides towards later NOx conversion.

DISCLOSURE OF THE INVENTION

This invention, in one aspect, is a sol-gel processed material made from alkoxides including heterometallic alkoxides consisting essentially of: (a) transition metal-aluminum heterometallic alkoxides having the general chemical formulae: $MAl(OPr^i)_n$, M being a transition metal and n being the valence of M; and (b) one or both of (i) alkali-metal-aluminum heterometallic alkoxides having the general chemical formula: $M'Al(OPr^i)_4$, M' being an alkali metal, and (ii) alkaline earth metal-aluminum heterometallic alkoxide having the general chemical formula: $M''[Al(OPr^i)_4]_2$, M'' being an alkaline earth metal. Optionally, lanthanide-aluminum heterometallic alkoxides represented by the general chemical formula $Ln[Al(OPr^i)_4]_3$, Ln being a lanthanide may additionally be included. Further, in addition to the heterometallic alkoxides mono-metal alkoxides of the metals disclosed above can be included during sol-gel processing to vary the ratio of the metals in the final product. While the above material when substantially free of precious metal was found to be excellent as a NOx trap material, the above material in other applications may be suitably used with precious metal.

According to another aspect, it is directed to a method of absorbing NOx and from lean-burn internal combustion engine exhaust gases using the materials disclosed above. More particularly, the method involves treating exhaust gas emissions from an internal combustion engine which include hydrocarbons, nitrogen oxides and carbon monoxides using a nitrogen oxide trap, the method comprising the steps of: locating in the exhaust gas passage of said internal combustion engine a nitrogen oxide trap which absorbs NOx contained in the exhaust gas when the oxygen concentration is oxidizing and which releases the absorbed NOx when the oxygen concentration of the exhaust gas is lowered. The engine may be gasoline or diesel.

The NOx trap absorbs NOx when the air/fuel ratio of exhaust gas flowing into the trap device is lean (of stoichiometric) and releases the absorbed NOx when the oxygen concentration in the exhaust gas is lowered, as during rich or stoichiometric operation of the engine. When the NOx is desorbed, it is converted to nitrogen and oxygen over the transition metal.

Advantageously, we have found that by using the transition metals in a sol-gel processed alumina matrix as a NOx trap material rather than conventional materials including precious metal like platinum, its NOx conversion efficiency is maintained even after the nigh temperature regeneration to decompose sulfates which may form. That is, the removal of SOx requires exposure of the material to high temperatures. Since the presert invention NOx (and SOx) absorbing material is thermally stable, its surface properties do not change on regeneration at high temperatures. Transition metals employed in the invention traps such as Fe, Co, Ni, etc., do not experience sintering as would, however, platinum used in conventional traps during regeneration.

DESCRIPTION OF PREFERRED EMBODIMENTS

Figure 1:
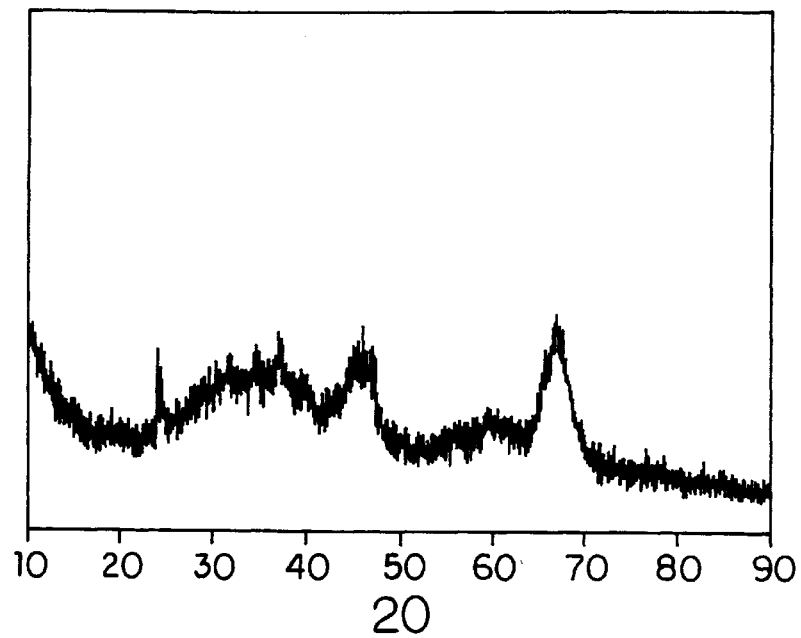
FIG. 1 is the XRD of the Example 1 invention embodiment material Cobalt oxide-BaO.6Al$_2$O$_3$ after sintering at 600° C.

The invention is sol-gel processed oxides from alkoxides including the heterometallic alkoxides disclosed above and discussed in more detail below. These materials are particularly useful for treating exhaust gases including nitrogen oxides, carbon monoxide and hydrocarbons generated by lean-burn internal combustion engine exhausts by absorbing NOx from the exhaust gases.

We have found that the invention material made by sol-gel techniques provides several improvements over conventional NOx absorbents. In one aspect, the sol-gel processed materials are more resistant to sulfur poisoning. We believe this is because the sol-gel process offers a better distribution of metals, e.g., transition metal in the alumina matrix than would conventional impregnation methods where the transition metal would be impregnated into conventional alumina. Further, because the product is made by sol-gel techniques the final product comprises oxides which are joined by chemical bonds to one other in the alumina matrix. We believe this leads to the formation of high surface area alumina materials with metals such as transition metals bonded to aluminum through oxygen. This prevents collapse of the pores in alumina and the formation of aluminum-oxygen-aluminum bonds, the aluminum hydroxy bonds on the surface having been desirably replaced with bonds with, e.g., transition metals. However, neither the validity nor understanding of the theories discussed above are necessary for the practice of the invention.

The technique of making the sol-solutions is well known to those skilled in the art. In the case of using alkoxides, it generally involves (1) hydrolysis of metal alkoxides in water and/or parent alcohol (acid or base can be used as catalyst if necessary) or (2) modification of metal alkoxides with organics such as acetyl-acetone and subsequent hydrolysis or (3) direct hydrolysis in water and peptization in the presence of acid. Additional discussions of sol-gel techniques as applicable to the present invention will be presented further below with particular respect to the preferred alkoxides for use in the present invention NOx absorption method.

The novel invention metal-alumina materials (herein such metal taken to be transition metal, alkali metal, alkaline earth metal, lanthanide) are made from alkoxides including certain heterometallic alkoxides. These heterometallic alkoxides are selected from the group consisting of alkoxides which include in the alkoxide compound two metals: one selected from (a) transition metal, alkali metal, alkaline earth metal, and lanthanide metal along with the (b) second being aluminum. In addition, single-metal alkoxides of aluminum, transition metal, alkali metal, alkaline earth metal, lanthanide metal or mixtures of any of them may be included during sol-gel processing to vary the ratio of aluminum to the metals like transition metal in the final sol-gel processed oxide.

Preferably, in the sol-cel processed oxide, the (a) aluminum oxide and (b) transition metal oxide (c) alkali metal and/or alkaline earths oxides are present in weight percents respectively of (a) 30–80 wt % (b)0.5–10 wt. % and (c) 10–30%. More preferably, in the product oxide, these weight percents are 70–80 wt. %, 2–10 wt. %, and 15–25 wt. % of these oxides, respectively. If lanthanide is included, it preferably is 10–50 wt. % based on the total weight of the oxides.

The transition metal-aluminum heterometallic alkoxide has the general chemical formulas MAl(OPr$^i$)$_n$, M being a transition metal and n being the valence of M, or MAl$_2$(OR)$_{6+n}$. Transition metal is meant to include, but not limited to, metals such as niobium, tantalum, chromium, molybdenum, cobalt, nickel, copper, iron, manganese, etc. Preferred transition metals useful for trapping application of the product oxide include iron, cobalt, and nickel. As would be apparent to one skilled in the art in view of the present disclosure, more than one such transition metal heterometallic alkoxide could be employed. That is, e.g., iron-aluminum alkoxides and copper-aluminum alkoxides could be employed.

As disclosed above, the alkali-metal-aluminum heterometallic alkoxides have the general chemical formula: M'Al(OPr$^i$)$_4$, M' being an alkali metal and the alkaline earth metal-aluminum heterometallic alkoxide have the general chemical formula: M''[Al(OPr$^i$)$_4$]$_2$, M'' being an alkaline earth metal. These heterometallic alkoxides may also be characterized as follows. The alkali metal-aluminum heterometallic alkoxide is [bis(2-propanolato)aluminum-bis(-$\mu$-propanolato)]-alkali metal. When isolated from reaction mixtures, these alkoxides are polymeric solids with associated solvent molecules e.g [(Pr$^i$OH)$_2$K($\mu$-OPr$^i$)$_2$Al($\mu$-OPr$^i$)$_2$]$_n$. The alkaline earth-aluminum heterometallic alkoxide is bis(bis(2-propanolato)aluminum)-tetrakis(-$\mu$-propanolato)]-alkaline earth. Alkali metal is meant to include such metals as lithium (Li), sodium (Na), potassium (K), rubidium (Rb), and cesium (Cs). Alkaline earth metal is meant to include such metals as magnesium (Mg), calcium (Ca), strontium (Sr), and barium (Ba). As would be apparent to one skilled in the art in view of the present disclosure, more than one such heterometallic alkoxide could be employed. That is, e.g., alkali metal-aluminum heterometallic alkoxides such as both lithium-aluminum and sodium-aluminum alkoxides could be employed or additionally or alternately an alkaline earth heterometallic alkoxide such as barium-aluminum alkoxide.

The lanthanide-aluminum heterometallic alkoxide, which is an optional component, is represented by the general chemical formula $Ln[Al(OPr^i)_4]_3$, Ln being a lanthanide. Alternately it is considered to be tris(bis(2-propanolato) aluminum)-hexakis-($\mu$-(2-propanolat o)]lanthanide. Lanthanide is meant to include members of the lanthanide series of the Periodic Table such as lanthanum (La) and cerium (Ce).

Advantageously, in these sol-gel processed invention materials, the metals, for example the transition metals, are seen to be uniformly distributed throughout the alumina matrix,. The metals being chemically linked into the alumina by bridges sucn as metal-oxygen-aluminum or metal-hydroxide-aluminum. Also these invention materials from heterometallic alkoxides have a higher surface area than materials conventionally made from mixtures of oxides like aluminum oxide, transition metal oxide or their precursors, e.g., nitrates, chlorides, etc. This increased surface area is advantageous e.g., when the material is employed for catalysis. More specifically, the special advantages for the desired NOx absorption of using heterometallic alkoxides is believed by the inventors to be the result of the molecular distribution of transition metals and e.g., the alkaline earths in an alumina matrix. Such distribution further improves the thermal stability of sol-gel processed materials as compared with those prepared from a mixture of mono-metallic alkoxides. This advantage is also important because the quality of the oxide is substantially maintained during the relatively high temperature SOx purging.

In its broadest embodiment, the product metal-alumina materials are made by reacting water and alkoxides including the particular heterometallic alkoxides disclosed above, which techniques are described in detail in U.S. Pat. No. 5,403,807 hereby incorporated expressly herein by reference. Further discussior is made in application Ser. No. 09/184,146 discussed above which is also hereby expressly incorporated by reference for its teachings. Using such techniques, for example, a cobalt-barium-aluminum-oxide material according to the present invention can be made from alkoxides including the cobalt heterometallic alkoxide [bis(bis(2-propanolato)-aluminum-tetrakis ($\mu$-(2-propanolato) cobalt, represented by the chemical formula: $Co[Al(O^iPr)_4]_2$. The ratio of transition metal oxide to aluminum oxide in the final product can be changed by including varying amounts of one or more of aluminum alkoxide or transition metal alkoxide (mono-metal alkoxides) with the heterometallic alkoxide. Thus the ratio of, e.g., cobalt to aluminum is changed, according to the above example, by mixing $Al(OPr^i)_3$ with $Co[Al(O^iPr)_4]_2$. Mono-metal alkoxides of the other metals, e.g., alkaline earth, alkali metal or lanthanide metal alkoxides may also be included if desired.

Sol-gel technology is widely known and most commonly comprises reacting water and an alkoxide having hydrolyzable alkoxy groups. Any such technology may be used to make the invention materials Preferred sol-gel methods for making the materials according to the present invention are detailed below in the examples. Still others considered within the scope of the invention will be apparent to those skilled in the art in view of the present disclosure.

In one embodiment of the present invention metal-alumina materials, for example, a reaction mixture of the alkoxides and water with isopropanol is formed, the reaction mixture is maintained at an elevated temperature, isopropanol and water are removed from the reaction mixture, and then the resulting xerogel is collected. The steps of sol-gel processing may be modified as would be apparent to those skilled in the art in view of the present disclosure, while still obtaining the transition metal-aluminum oxide materials useful for NOx trapping disclosed herein.

The metal-aluminum oxide invention material may include minor proportions of other materials to stabilize or otherwise enhance the oxide properties. Stabilizer materials such as silica commonly included in aluminum oxide materials to be used at elevated temperatures would also be useful herein. When included they preferably would be included by mixing silica sol with heterometallic alkoxide mixture along with water during hydrolysis and in an amount up to about 10 wt. % based on the total weight of the product oxide.

For NOx trap application the material is expected to be substantially free of precious metal to avoid the problems associated with sintering as discussed above. For other applications, however, the material may further include precious metal included with the sol-gel materials during processing or impregnated on the oxide material after it is formed. Such techniques are well known in the art and disclosed for example in the patents and patent applications herein expressly incorporated by reference. The precious metal can be platinum, palladium, or rhodium or a mixture of any of them. For example, incipient wetness techniques may be used where the oxide material can be contacted with, e.g., hexachloroplatinic acid solution to deposit platinum. The impregnated product would be dried and calcined generally before use. Alternately, the platinum could be included in the sol as, e.g., platinum 2-ethyl hexanoate. In this case, rather than the platinum being merely loaded on the metal oxide it would be included within the metal oxide.

In some instances, when the inclusion cf precious metal is desired, it would be included in the alumina-based metal oxide in an amount of at least 0.1 wt. % based on the total weight of the alumina-based metal oxide. Preferably, the precious, metal is employed in an amount of 0.1 to 5 wt. % based on the weight of the oxide, more preferably being included in about 1 to 2 wt. %. Platinum is the preferred precious metal, however, when platinum is included other precious metal like rhodium in relatively small amounts is desirably also added, optimally as 1–5 wt. % rhodium based on the weight of the support. Rhodium is desirably included since it provides a broadening of the NOx conversion window due to increased conversion efficiency of nitrogen oxides at higher temperatures.

In useful application which may be of several types including, e.g., as a NOx absorbent material in an exhaust system for lean-burn engines as disclosed herein or as a catalyst support, a coating of this material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the absorbent/catalyst of this invention. It is preferred that the surface area of the monolithic structure provide 50–100 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure. Generally this oxide material is provided on the substrate by making a slurry thereof and washcoating it on the substrate. Still other ways of providing the invention material for use will be apparent to those skilled in the art in view of the present disclosure, the method not being critical to the present invention. Generally, for use in an exhaust system this washcoat is subjected to elevated temperatures to calcine the oxide material. Optimally, the substrate carries a washcoat of the final oxide material in an amount of between about 25% and 40% by weight based on the weight of the substrate (e.g., monolith).

For practical application, the amount of nitrogen oxides absorbed in the NOx trap would be monitored. This can be done, e.g., by monitoring the concentration of the nitrogen oxides in the exhaust gas entering and leaving the trap and watching for an increase in the concentration (nitrogen oxide breakthrough), or using estimating means such as torque/load measurements of the engine. Still other ways to determine the amount of nitrogen oxide absorbed in the trap, and consequently the available absorbent ability of the trap material, will be apparent to those skilled in the art.

When it is desired to purge the trap of absorbed nitrogen oxides and sulfates, as for example when it is determined that the trap has reached a predetermined optimal fullness of absorbed NOx, it is subjected to a nitrogen oxide purge by passing exhaust gases whose air/fuel ratio is stoichiometric or preferably rich of stoichiometric. This may be accomplished by switching the engine, e.g., a gasoline engine, to rich air/fuel operating mode or providing an increased concentration of, e.g., hydrocarbons into the gases entering the trap, such as by providing supplemental fuel or other hydrocarbons. Still other ways to increase the air/fuel ratio of the exhaust gas in the trap for purging will be apparent to those skilled in the art in view of the present disclosure. After the trap has been purged of nitrogen oxide, either partially or fully, the trap is again expected to be subjected to lean engine operation whereby the trap will absorb the nitrogen oxides from the exhaust gas. And so the absorb/purge cycling will be repeated. As discussed herein, use of the present invention leads to a NOx trap which can be regenerated in rich cycle at high temperatures without loss of performance.

The exhaust gas treatment system of this invention may include another catalyst device as, for example, a catalytic converter employing a conventional three-way catalyst containing palladium, etc., or a lean-burn catalyst such as one containing transition metals like silver, copper, etc. These catalysts, e.g., the three-way catalyst, can be placed upstream of the NOx trap, hence closer to the engine. In such an arrangement, the three-way catalyst being preferably closely mounted to the engine would warm up quickly and provide for efficient engine cold start emission control. The NOx trap would be positioned downstream of the three-way catalyst where the lower exhaust gas temperature enables maximum NOx trap efficiency. Also, with the NOx trap positioned downstream of the three-way catalyst in a remote location, it is protected against very high exhaust gas temperatures which could damage it.

As discussed above, during periods of lean-burn engine operation utilizing a three-way catalyst closer to the engine, when the NOx passes through the three-way catalyst located closer to the engine, NOx is stored on the trap. The NOx trap is periodically regenerated by short periods or intervals of slightly rich engine operation. Thus, the stored NOx is then released (purged) from the trapping material and is catalytically reduced over the transition metal in the trap by the excess hydrocarbons and other reductants like Co and $H_2$ present in the exhaust gas. In general, the released NOx is efficiently converted to $N_2$ and $O_2$. However, one may wish to place a second three way catalyst downstream of the NOx trap in order to further aid in this regard. As disclosed above, the invention NOx trap is to be used for gasoline engines or diesel engines, where during the lean-burn portion the air/fuel ratio is usually in the range 19–27 or higher for diesel.

EXAMPLE 1

Figure 2:
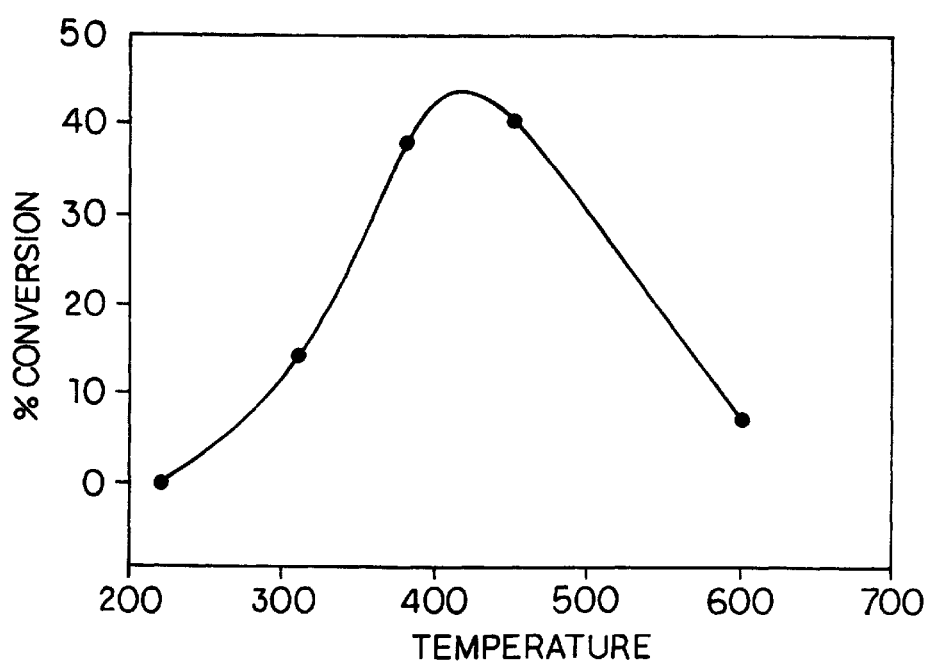
FIG. 2 is a graph of the NOx trapping efficiency of the Example 1 material as a function of temperature.

A solution of $Co[Al(O^iPr)_4]_2$ in isopropanol (4.49 ml of 10% solution) is added to a solution of $Ba[Al(O^iPr)_4]_2$ (1.24 g) and $Al(O^iPr)_3$ (4.38 g) in isopropanol (50 ml). The resulting clear solution is added to water (80 ml) at 80° C. A gel forms immediately which is dried by boiling off water. The xerogel, thus formed, is pyrolyzed at 600° C. to remove volatiles. The BET surface area of powder is 202 $m^2/q$ and BJH desorption pore size is 3.9 nm. FIG. 1 shows a X-ray powder diffraction of Cobalt oxide/$BaO.6Al_2O_3$ material. It can be seen from FIG. 1 that the material shows only weak peaks due to alumina. FIG. 2 shows the NOx trapping efficiency of the $Co/BaO.6Al_2O_3$ material.

EXAMPLE 2

A solution of $Fe[Al(O^iPr)_4]_3$ in isopropanol (6.48 ml of 10% solution) is added to a solution of $Ba[Al(O^iPr)_4]_2$ (1.24 g) and $Al(O^iPr)_3$ (4.38 g) in isopropanol (50 ml). The resulting clear solution is added to water (80 ml) at 80° C. A gel forms immediately which is dried by boiling off water. The xerogel, thus formed, is pyrolyzed at 600° C. to remove volatiles.

EXAMPLE 3

A solution of $Ni[Al(O^iPr)_4]_2$ in isopropanol (4.49 ml of 10% solution) is added to a solution of $Ba[Al(O^iPr)_4]_2$ (1.24 g) and $Al(O^iPr)_3$ (4.38 g) in isopropanol (50 ml). The resulting clear solution is added to water (80 ml) at 80° C. A gel forms immediately which is dried by boiling off water. The xerogel, thus formed, is pyrolyzed at 600° C. to remove volatiles.

What is claimed is:

1. An oxide material useful to absorb NOx in an oxidizing exhaust gas, said oxide material being made by sol-gel techniques from alkoxides comprising heterometallic alkoxides, which comprise:
   (a) transition metal-aluminum heterometallic alkoxide having the general chemical formula: $MAl(OPr^i)_n$, M being a transition metal and n being the valence of M;
   (b) at least one of (i) alkali-metal-aluminum heterometallic alkoxides having the general chemical formula: $M'Al(OPr^i)_4$, M' being an alkali metal selected from the group consisting of lithium, sodium, potassium, rubidium, and cesium , and (ii) alkaline earth metal-aluminum heterometallic alkoxide having the general chemical formula: $M''(Al(OPr^i)_4)_2$, M'' being an alkaline earth metal; and optionally,
   (c) lanthanide-aluminum heterometallic alkoxides having the general chemical formula $Ln(Al(OPr^i)_4)_3$, Ln being a lanthanide.

2. The material according to claim 1 wherein said transition metal is selected from the group consisting of iron, cobalt, and nickel.

3. The material according to claim 1 wherein said alkaline earth metal is selected from the group consisting of magnesium, calcium, strontium, and barium.

4. The material according to claim 1 wherein said lanthanide is selected from the group consisting of lanthanum and cerium.

5. The material according to claim 1 where said alkoxides further include mono-metal alkoxides of metals selected from the group consisting of aluminum, transition metal, alkali metal, alkaline earth metal, and lanthanide metal.

6. The material according to claim 1 which is substantially free of precious metal.

7. The material according to claim 1 wherein said techniques include:

forming a reaction mixture from water and said alkoxides including the heterometallic alkoxides; and adding acid to said reaction mixture to form a sol.

8. The material according to claim 7 wherein said techniques further comprises heating said reaction mixture prior to the addition of said acid.

9. The material according to claim 8 wherein said method further comprises removing from said reaction mixture alcohol formed as a result of hydrolysis of said heterometallic alkoxides.

10. The material according to claim 1 wherein said oxide material includes 30–80 wt. % aluminum oxides, 0.5–10 wt. % transition metal oxides, and 10–30 wt. % of the total of alkali metal oxides and alkaline earth oxides.

11. The material according to claim 1 which further comprises precious metal which is either included during sol-gel processing of said oxide or loaded on the oxide.

12. The material according to claim 1 wherein said precious metal is present in an amount of 1–5 wt. % based on the weight of the oxide.

13. A method for making a transition metal-alumina material by sol-gel techniques which comprises:

reacting (A) water and (B) alkoxides comprising heterometallic alkoxides, which:

(a) transition metal-aluminum heterometallic alkoxide having the general chemical formula: $MAl(OPr^i)_n$, M being a transition metal and n being the valence of M;

(b) at least one of (i) alkali-metal-aluminum heterometallic alkoxides having the general chemical formula: $M'Al(OPr^i)_4$, M' being an alkali metal selected from the group consisting of lithium, sodium, potassium, rebidium, and cesium, and (ii) alkaline earth metal-aluminum heterometallic alkoxide having the general chemical formula: $M''[Al(OPr^i)_4]_2$, M'' being an alkaline earth metal; and optionally, (c) lanthanide-aluminum heterometallic alkoxides having the general chemical formula $Ln[Al(OPr^i)_4]_3$, Ln being a lanthanide.

14. The method according to claim 13 which comprises forming a reaction mixture from water and said alkoxides;

maintaining the reaction mixture at a temperature to form a gel thereof; and adding an acid to said gel to convert said gel to a sol.

15. The method according to claim 14 which further comprises the step of applying a coating of said sol to a substrate and heating said coating to a temperature above about 300° C. to calcine said coating.

* * * * *